(12) United States Patent
Mayenschein et al.

(10) Patent No.: US 7,603,961 B2
(45) Date of Patent: Oct. 20, 2009

(54) LIGHTED ORIENTATION DEVICE

(76) Inventors: Danny Mayenschein, 3531 Gatlin Place Cir., Orlando, FL (US) 32812;
Jacqueline J. Mayenschein, 3531 Gatlin Place Cir., Orlando, FL (US) 32812

( * ) Notice: Subject to any disclaimer, the term of this patent is extended or adjusted under 35 U.S.C. 154(b) by 0 days.

(21) Appl. No.: 11/434,457

(22) Filed: May 15, 2006

(65) Prior Publication Data

US 2007/0261630 A1  Nov. 15, 2007

(51) Int. Cl.
*G01C 9/32* (2006.01)
(52) U.S. Cl. .................. 116/215; 116/200; 116/202; 33/378; 33/379
(58) Field of Classification Search .............. 116/215, 116/200, 202, 205, 206, 216–218, DIG. 7; 33/354, 348, 378, 349, 379
See application file for complete search history.

(56) References Cited

U.S. PATENT DOCUMENTS

| | | | | |
|---|---|---|---|---|
| 3,084,443 A | * | 4/1963 | Kaatz et al. ............... 356/140 |
| 3,844,248 A | * | 10/1974 | Parker .................. 116/202 |
| 4,064,428 A | * | 12/1977 | Van Zandt ................ 362/34 |
| 4,164,077 A | | 8/1979 | Thomas |
| 4,193,109 A | * | 3/1980 | Heffernan et al. ............ 362/34 |
| 4,379,320 A | * | 4/1983 | Mohan et al. .............. 362/34 |
| 4,407,075 A | | 10/1983 | MacDermott et al. |
| 4,635,166 A | * | 1/1987 | Cameron ................. 362/34 |
| 4,932,133 A | | 6/1990 | Bruhn |
| 5,158,349 A | * | 10/1992 | Holland et al. ............. 362/34 |
| 5,180,221 A | | 1/1993 | Yoder |
| 5,588,217 A | * | 12/1996 | Lindner et al. ............. 33/379 |
| 6,115,928 A | | 9/2000 | Dauerer |
| 6,802,277 B1 | * | 10/2004 | Clay et al. ................ 116/101 |
| 2002/0017029 A1 | | 2/2002 | Beyer |

* cited by examiner

*Primary Examiner*—R. A. Smith
*Assistant Examiner*—Tania C Courson
(74) *Attorney, Agent, or Firm*—Dale J. Ream

(57) ABSTRACT

A lighted orientation device according to the present invention includes an outer housing having a construction that is resilient, generally spherical, and defines an interior space for holding fluid. A directional indicator such as a float is positioned within the outer housing and rises to a top surface of the fluid for indicating an upward direction. The float is also constructed of a resilient material and includes first and second chemicals separated by a breakable membrane. The two chemicals react when combined to produce light, whereby a user may view the float and ascertain which direction is "up". The lighted orientation device may be coupled to a digging tool according to an alternative embodiment such that a user may begin digging out of an avalanche as soon as their orientation is determined.

4 Claims, 3 Drawing Sheets

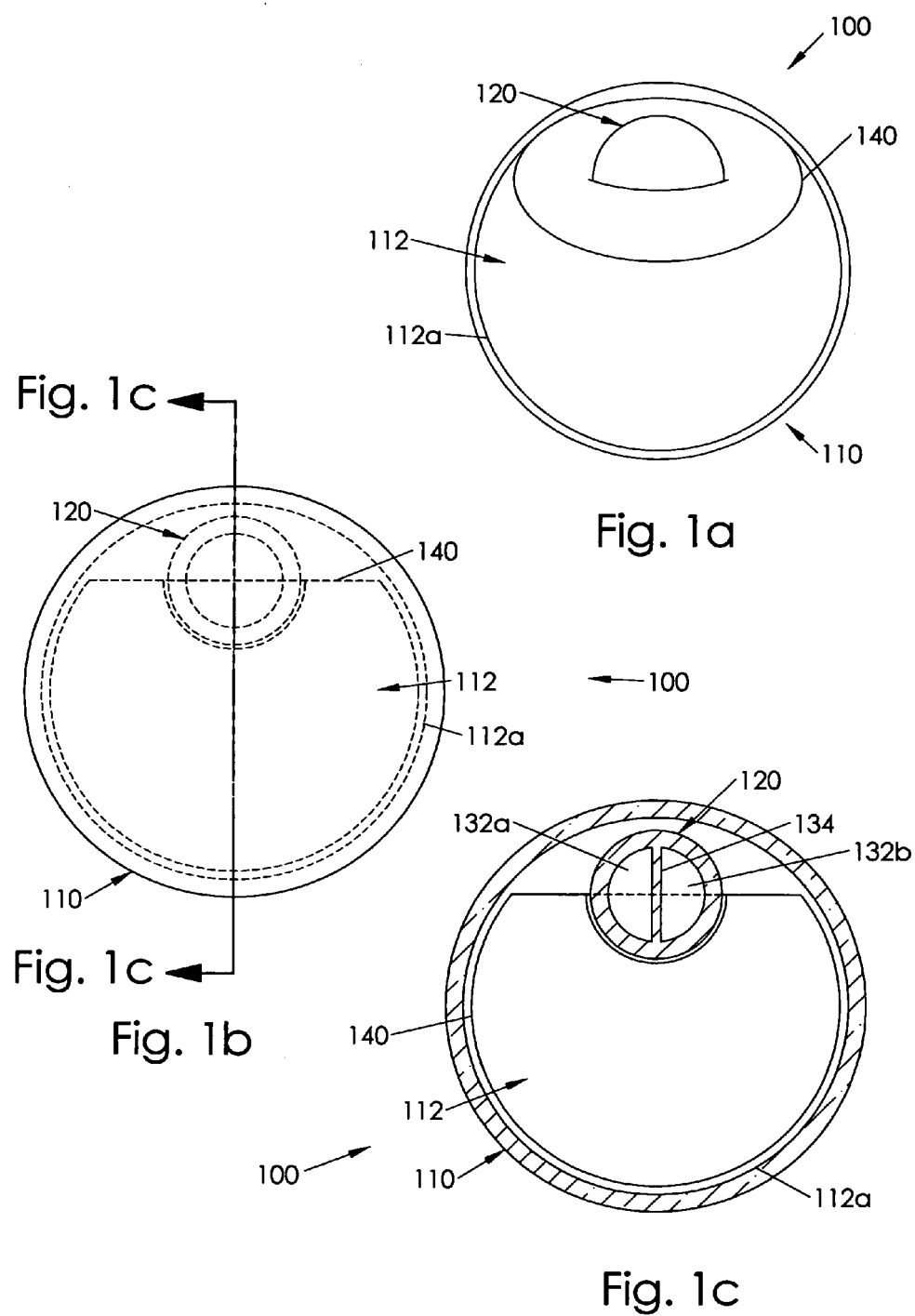

LIGHTED ORIENTATION DEVICE

BACKGROUND OF THE INVENTION

This invention relates generally to orientation devices and, more particularly, to a lighted orientation device that enables a person who is in a dark and disorienting situation to identify which direction is up so as to pursue an appropriate direction of escape.

An avalanche can be deadly not only because of the violent forces and powerful weight of falling snow, but also because a person buried in the snow may be disoriented by the darkness, isolation of the situation, and the trauma of being violently buried. Even if the person is physically capable of moving or digging, he may be unable to discern which direction is up, potentially resulting in digging in a sidewise or downward direction. The problem of an underwater blackout is an analogous situation that may also result in a disorienting situation.

Various devices have been proposed in the art for determining an upward direction or for determining if an orientation is level. Although assumably effective for their intended purposes, the existing devices often require battery or electrical power to energize a light source, or otherwise include a complicated and expensive construction.

Therefore, it would be desirable to have a lighted orientation device that includes a float in a ball of liquid for indicating an upward direction. Further, it would also be desirable to have a lighted orientation device in which the float includes a light source that may be selectively activated by a user. In addition, it would be desirable to have a lighted orientation device in which the light source includes a power source that may be stored indefinitely without loss of power—in other words, having a power source that is chemically activated rather than electrical or battery power.

SUMMARY OF THE INVENTION

A lighted orientation device according to the present invention includes an outer housing having a construction that is resilient, generally spherical, and defines an interior space for holding fluid. The orientation device also includes a float positioned in the fluid within the housing for indicating an upward direction. A user who has become trapped in an avalanche or underwater needs to know which direction is "up" so as to quickly plan a way to the top. However, this upward indicator is not helpful in a darkened situation below a depth of snow or water unless the float can be lighted. In addition, a light source for illuminating the indicator should not rely on a power source that can become depleted, that is expensive, or that is not physically capable of being housed in a small housing, e.g. battery or direct electrical power.

Accordingly, the lighted orientation device includes first and second chemicals disposed in the indicator that are separated by a destructible membrane and which react to one another upon contact to produce light. These chemicals will not accidentally react to one another upon a jolt or shock, but rather only when squeezed together by a user or the destructible membrane is otherwise broken. Then, the user is able to view the float which is indicating an upward direction and can plan a way of escape.

Therefore, a general object of this invention is to provide a lighted orientation device for indicating an upward direction to a person who may be trapped and disoriented in an avalanche.

Another object of this invention is to provide a lighted orientation device, as aforesaid, that is small and compact so as to be carried conveniently by a person.

Still another object of this invention is to provide a lighted orientation device, as aforesaid, having a resilient housing for containing a fluid and a directional indicator.

Yet another object of this invention is to provide a lighted orientation device, as aforesaid, in which the directional indicator contains a pair of chemicals that, when combined, react to create a light source.

A further object of this invention is to provide a lighted orientation device, as aforesaid, that does not require battery power.

A still further object of this invention is to provide a lighted orientation device, as aforesaid, that is lightweight and inexpensive to manufacture.

Other objects and advantages of the present invention will become apparent from the following description taken in connection with the accompanying drawings, wherein is set forth by way of illustration and example, an embodiment of this invention.

BRIEF DESCRIPTION OF THE DRAWINGS

FIG. 1a is an elevated perspective view of a lighted orientation device according to a preferred embodiment of the present invention;

FIG. 1b is a side view of the lighted orientation device as in FIG. 1a;

FIG. 1c is a sectional view taken along line 1c-1c of FIG. 1b;

FIG. 2a is a side view of only the outer housing as in FIG. 1a;

FIG. 2b is a sectional view taken along line 2b-2b of FIG. 2a;

FIG. 2c is an isolated side view of only the float as in FIG. 1a;

DESCRIPTION OF THE PREFERRED EMBODIMENT

Figure 2A:
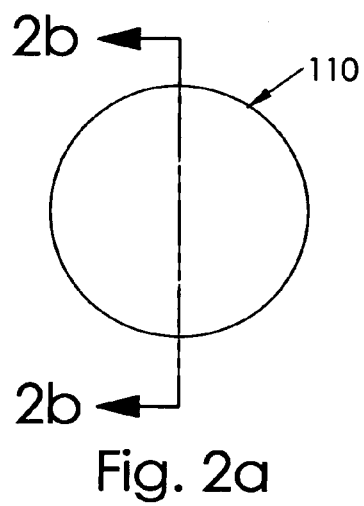
Figure 2B:
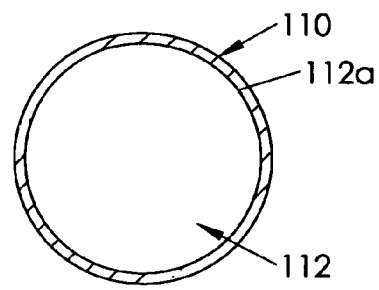
Figure 2C:
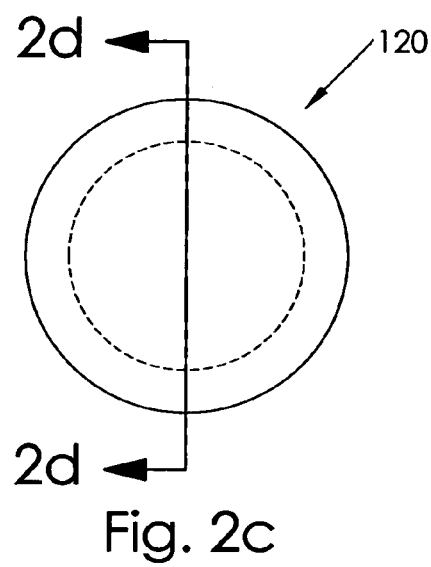

A lighted orientation device 100 according to the present invention will now be described in detail with reference to FIGS. 1a through 3 of the accompanying drawings. More particularly, a lighted orientation device 100 according to the current invention includes an outer housing 110, an indicator 120, and means 130 for lighting the indicator 120.

The outer housing 110 defines an interior space 112, and the interior space 112 preferably has a boundary 112a that is at least partially spherical. The indicator 120 is located in the interior space 112 to indicate an upward direction. As shown throughout the drawings, fluid 140 may be in the interior space, and the indicator 120 may be less-dense than (and suspended in) the fluid 140. In such a configuration, the indicator 120 may be referred to as a float 120, and the float 120 may indicate the upward direction by settling to a top of the interior space 112. If the float 120 is spherical, and the boundary 112a is at least partially spherical, the boundary 112a may allow the float 120 to point precisely upwards by allowing the float 120 to settle appropriately along the boundary 112a. Alternately, the fluid 140 may be absent from the interior space 112, and the indicator 120 may indicate the upward direction by settling to a lower-most point of the interior space 112. Notably, the outer housing 110 is transparent in at least one area so that the indicator 120 may be seen by a user. The fluid 140 preferably has a low freezing point and may be clear or fluorescent, and the indicator 120 is preferably of high-contrast to the fluid 140 so that the indicator 120 may be readily and easily seen. It should be appreciated that the spherical boundary 112a and the spherical indicator 120 allow a user to ascertain "up" much more precisely than if the respective boundary 112a and indicator 120 were not complementary.

Figure 2D:
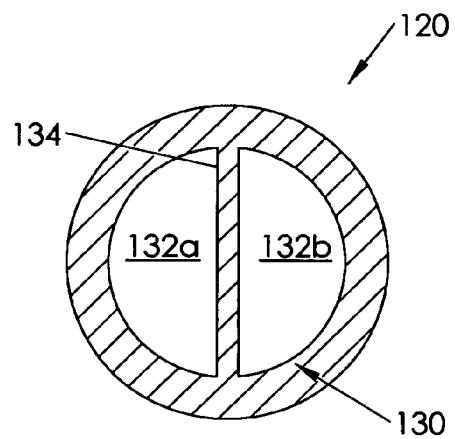
FIG. 2d is a sectional view taken along line 2d-2d of FIG. 2c.

Various means 130 for lighting the indicator 120 may be utilized. As shown in FIGS. 1c and 2d, first and second chemicals 132a, 132b may be disposed in the indicator 120 and separated by a destructible membrane 134. The first and second chemicals 132a, 132b may be reactive to produce light when the membrane 134 is ruptured and the chemicals 132a, 132b are combined. For example, the first chemical 132a may include a hydrogen peroxide solution, and the second chemical 132b may include a phenyl oxalate ester and fluorescent dye solution. The outer housing 110 and the indicator 120 may be resilient so that the user can selectively squeeze the indicator 120 through the outer housing 110 to rupture the membrane 134. For example, the outer housing 110 may be constructed of silicon rubber, natural rubber neoprene, and/or another resilient material. The indicator 120 may also be constructed of similar resilient materials.

In an unshown embodiment, means 130 for lighting the indicator 120 may include a small battery and circuit coupled to an LED placed in the indicator 120. The circuit may be capable of sensing shock so that the LED is energized when a shock is sensed. The LED may then remain energized for a predetermined amount of time.

In another unshown embodiment, means 130 for lighting the indicator 120 may include a small battery coupled to an LED placed in the indicator 120, and a switch may be in communication with the battery to selectively energize the LED.

Figure 3:
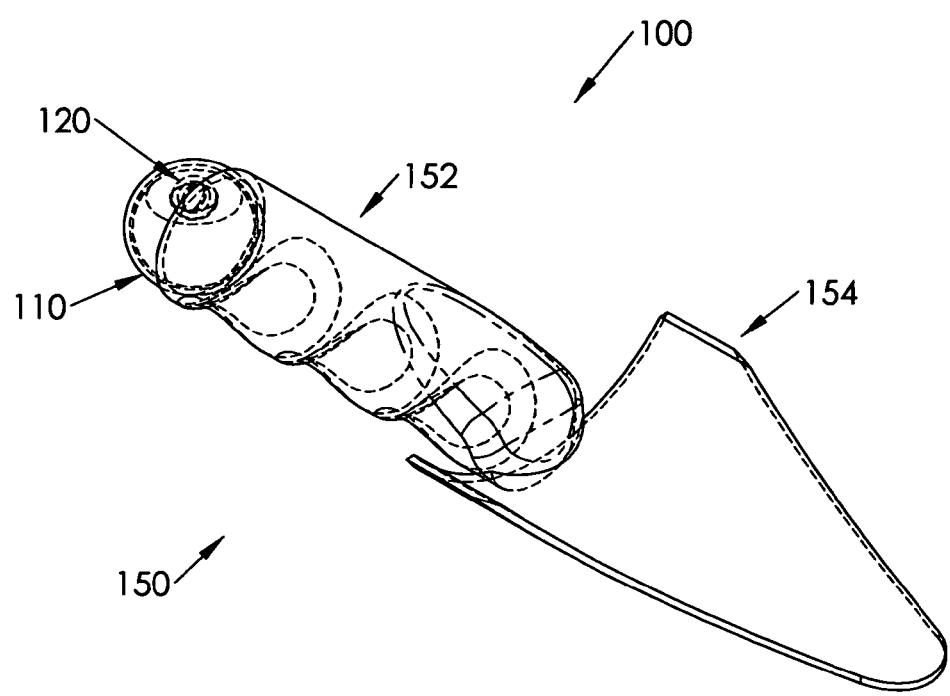
FIG. 3 is a perspective view of a lighted orientation device coupled to a digging tool according to another embodiment of the present invention.

As shown in FIG. 3, the lighted orientation device 100 may further include a tool 150 (such as a digging tool 150) coupled to the outer housing 110. The outer housing 110 may be fixedly or removably attached to the digging tool 150, and as shown in FIG. 3, a handle 152 of the digging tool 150 may at least partially encompass the outer housing 110. The digging tool 150 may include a blade portion 154 as well as the handle portion 152, and the handle and blade portions 152, 154 may collectively have a one-piece construction for durability and/or cost reasons; alternately, a multiple-piece construction may be used.

In use, the lighted orientation device 100 may be carried by a snow skier, someone hiking in the snow, or anyone else that may need to know which way is "up". Skiers and those around snow are particularly disoriented when caught in an avalanche or similar hazard, and they often have no way of knowing which way to dig to reach the surface. When in a situation where "up" cannot be ascertained, the user may check the device 100 by looking through the outer housing 110 to see the position of the indicator 120 as described above. If light is needed to see the indicator 120, the means 130 for lighting the indicator 120 may be employed. For example, the user may squeeze the indicator 120 through the outer housing 110 to rupture the membrane 134, causing the first and second chemicals 132a, 132b to mix. The reactive nature of the first and second chemicals 132a, 132b may cause light to be produced as the chemicals 132a, 132b are mixed. If the digging tool 150 is included, the user may use the digging tool 150 to dig out of the snow (if needed).

It is understood that while certain forms of this invention have been illustrated and described, it is not limited thereto except insofar as such limitations are included in the following claims and allowable functional equivalents thereof.

What is claimed is as follows:

1. A lighted orientation device, comprising:
   an outer housing constructed of a resilient material and defining an interior space having a boundary that is at least partially spherical, said outer housing interior space including fluid having a density;
   wherein said outer housing is transparent in at least one area;
   a float suspended in said fluid in said interior space, said float being resilient and having a density less than the density of said fluid such that said float maintains a position atop said fluid indicative of an upward direction; and
   first and second chemicals disposed in said float for selectively lighting said float, said first and second chemicals being separated by a destructible membrane and being reactive to produce light when said membrane is ruptured and said first and second chemicals are combined;
   wherein said membrane is ruptured when said outer housing is depressed and sufficiently bears against said membrane in said float.

2. The device of claim 1, wherein:
   said first chemical includes a hydrogen peroxide solution; and
   said second chemical includes a phenyl oxalate ester and fluorescent dye solution.

3. The device of claim 1, further comprising a digging tool coupled to said outer housing.

4. The device of claim 3, wherein:
   said digging tool includes a blade portion and a handle portion collectively having a one-piece construction; and
   said outer housing is coupled to said handle portion.

\* \* \* \* \*